United States Patent

[11] 3,549,145

| [72] | Inventor | Karl-Heinz Trautmann<br>an der Muhlenbreede, Germany |
|---|---|---|
| [21] | Appl. No. | 740,334 |
| [22] | Filed | June 26, 1968 |
| [45] | Patented | Dec. 22, 1970 |
| [73] | Assignee | Windmoller & Holscher<br>Lengerich of Westphalia, Germany |
| [32] | Priority | July 5, 1967 |
| [33] | | Germany |
| [31] | | No. W44310 |

[54] STACKING APPARATUS FOR PLASTICS MATERIAL SHEETING
14 Claims, 10 Drawing Figs.

[52] U.S. Cl. ................................................ 271/79;
93/93
[51] Int. Cl. .................................................. B65h 29/28,
B65h 33/14
[50] Field of Search .......................................... 271/79, 64;
93/93.3(Stickney)

[56] References Cited
UNITED STATES PATENTS
2,001,295  5/1935  Barber.......................... 271/79

Primary Examiner—Edward A. Sroka
Attorney—Fleit, Gipple & Jacobson

ABSTRACT: Endless conveyor chains convey the workpieces in gripping tools. Means for collecting the workpieces are provided. At least two endless chain conveyors extend through a common workpiece-charging area. The collecting means associated with the chain conveyors are spaced apart. Each chain conveyor extends as far as to the associated collecting means. The chain conveyors are provided with regularly spaced gripping tools only in sections of their length. Those length sections of the chain conveyors which are provided with gripping tools are staggered so as to move in alternation without interruption through the workpiece-charging area.

INVENTOR
Karl-Heinz TRAUTMANN
By

Stevens, Davis, Miller and Mosher
his ATTORNEYS

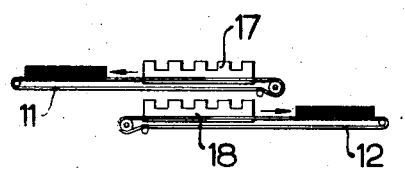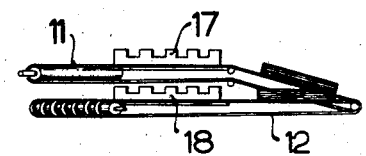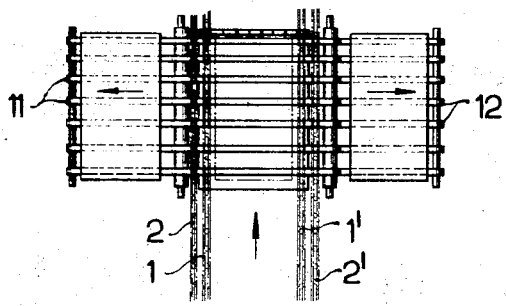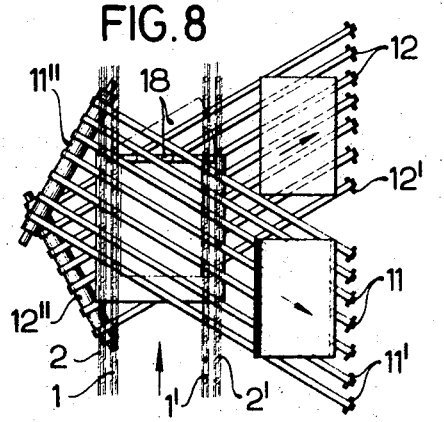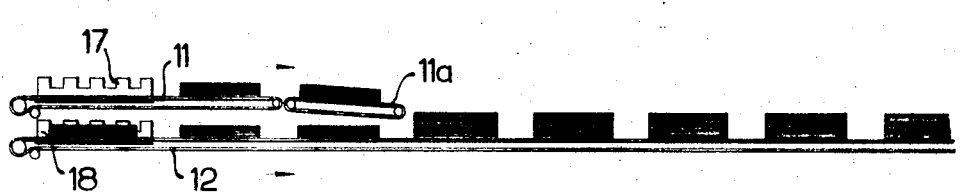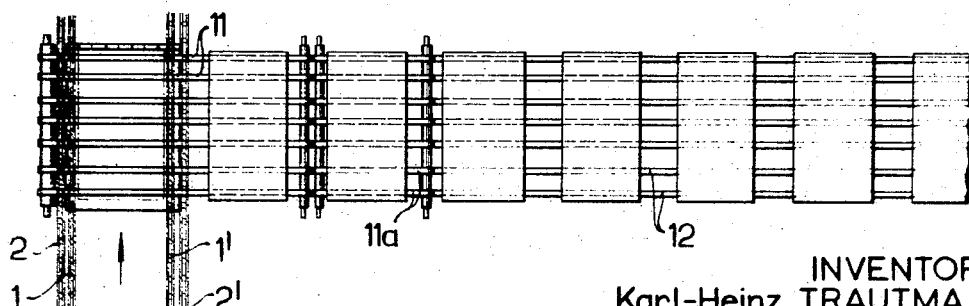
INVENTOR
Karl-Heinz TRAUTMANN
By
Stevens, Davis, Miller and Mosher
his ATTORNEYS

STACKING APPARATUS FOR PLASTICS MATERIAL SHEETING

This invention relates to a stacking apparatus for use with machines for processing paper and plastics material sheeting, preferably for making bags, which apparatus comprises endless conveyor chains which convey the workpieces in gripping tools, and means for collecting the workpieces. In the known apparatus of this kind the conveyor chains convey the workpieces in a continuous succession so that a continuously growing stack of workpieces is formed. To form individual stacks containing a predetermined number of workpieces, two stacking magazines have already been provided, which are moved in alternation into the range in which the gripping tools release the workpieces. This practice cannot be adopted unless the change of magazine can be performed within the time between the ejection of two workpieces. The large numbers of workpieces to be handled per unit of time in modern machines for processing paper and sheeting and the fact that the workpieces are often large do not permit of such a fast change in many cases. For this reason, it is usual to drop the workpieces onto a conveyor belt, which moves at a lower speed than the conveyor chains so that the workpieces are shingled on the conveyor belt. The workpieces must then be manually removed from the conveyor belt and pushed together to form stacks. This stacking process requires the use of human labor.

It is an object of the invention to enable an automatic collection and discharge of the workpieces in stacks containing a predetermined number of workpieces in machines for processing paper or sheeting even if these machines operate at a high production rate. This object is accomplished according to the invention in that at least two endless chain conveyors extend through a common workpiece-charging area, the collecting means associated with the chain conveyors are spaced apart, each chain conveyor extends as far as to the associated collecting means, the chain conveyors are provided with regularly spaced gripping tools only in sections of their length and those length sections of the chain conveyors which are provided with gripping tools are staggered so as to move in alternation without interruption through the workpiece-charging area.

In the stacking apparatus according to the invention, the chain conveyors can receive in their common workpiece-charging area in a continuous succession the workpieces coming from the processing machine and each conveyor then conveys workpieces in the number received by it, which number corresponds to the number of grippers in its length section provided with grippers, to the associated collecting or depositing station. As each chain conveyor conveys workpieces only in one part or a plurality of parts of its entire length, the entire transit time of each chain length section which is not provided with gripping tools is available for the discharge of the previously formed stack of workpieces. In this way, each chain conveyor and the collecting means associated with it can form individual stacks containing a predetermined number of workpieces. The number of workpieces in each stack may correspond either to the number of gripping tools in one series of gripping tools or a multiple of that number, if the stack is not discharged until a plurality of series of gripping tools have passed.

The chain conveyors may differ in length. In such case, the longer chain conveyor must have at least two series of gripping tools and two length sections which are free of gripping tools. In such arrangement, the delivery stations may be in the same plane. It will be desirable, however, if the chain conveyors have the same length and their lower courses extend in different planes because this requires only a small space. The means for collecting the workpieces may be associated with the lower courses of the chain conveyors and may consist of a transverse belt conveyor for each lower course, a transverse stop disposed above the transverse belt conveyor and engageable by the leading end of the workpiece, and means for opening the gripping tools shortly before they reach the transverse stop, and the transverse belt conveyors may be intermittently operable in such a manner that they perform their conveying movement only during the transit of that length section of the associated chain conveyor which is free of gripping tools along the lower course of said conveyor.

The removal of the stacks of workpieces from the transverse belt conveyors may be carried out in various ways. The transverse belt conveyors may extend out of the apparatus on the same side and the lower transverse belt conveyor may be longer than the upper one, the upper belt conveyor may be succeeded by a transfer belt conveyor which is alternately driven in synchronism with the upper and lower transverse belt conveyors, respectively. The transverse belt conveyors may extend out of the apparatus in opposite directions so that the stacks of workpieces are removed from the stacking apparatus or charged to further belt conveyors in alternation on both sides of the stacking apparatus. Alternatively, the transverse belt conveyors may extend in diverging directions out of the apparatus on the same side of the chain conveyors so that the stacks of workpieces can be removed in alternation from the transverse belt conveyors at juxtaposed delivery stations. In the latter case, the transverse belt conveyors extend suitably on the same level at their delivery ends.

In a further embodiment of the invention, it will be desirable if the spacing of the gripping tools is less than the length of the conveyed workpieces and the speed of travel of the chain conveyors is less than the speed of travel of the workpieces in the preceding processing machine. This results in a smaller overall length of the stacking apparatus according to the invention and a desirable reduction of the discharge speed so that a rough handling of the workpieces will be avoided. In this case the workpieces are suitably charged in such a manner that the chain conveyors extend in an approximately vertical plane in the workpiece charging area and the workpieces are fed in a vertical direction. A pivoted deflector plate may be disposed below the last set of workpiece-conveying rollers and may serve to deflect the free ends of the workpieces outwardly so that they do not drop onto next succeeding gripping tools, which follow at a distance which is less than the length of the workpiece, and an interference with the proper charging of the gripping tools will be avoided.

The gripping tools consist suitably of an elongated carrier, which is provided with grippers and secured with mating members to the pair of conveyor chains. The movable gripping jaw of each gripper consists suitably of a pin, which is urged by a spring against the fixed gripping jaw. It is also desirable to provide a bar, which is pivoted to the carrier by lateral levers and has forklike indentations, where the bar engages the underside of collars on the pins of the gripping tool, said bar being movable by means of cam follower rollers carried by the levers and cooperating with stationary cams so that the required opening and closing movements will be performed. It will also be desirable if the mouth of each gripper is provided on the workpiece-receiving side with converging guide plates so that the workpieces which fall freely as they are charged from above, as has been proposed hereinbefore, will be reliably gripped.

The invention will be explained more in detail hereinafter with reference with the drawing, which shows an embodiment by way of example. In the drawing.

FIGS. 5—10 show in side elevations and top plan views a plurality of desirable embodiments and arrangements of the transverse conveying means.

Figure 1:
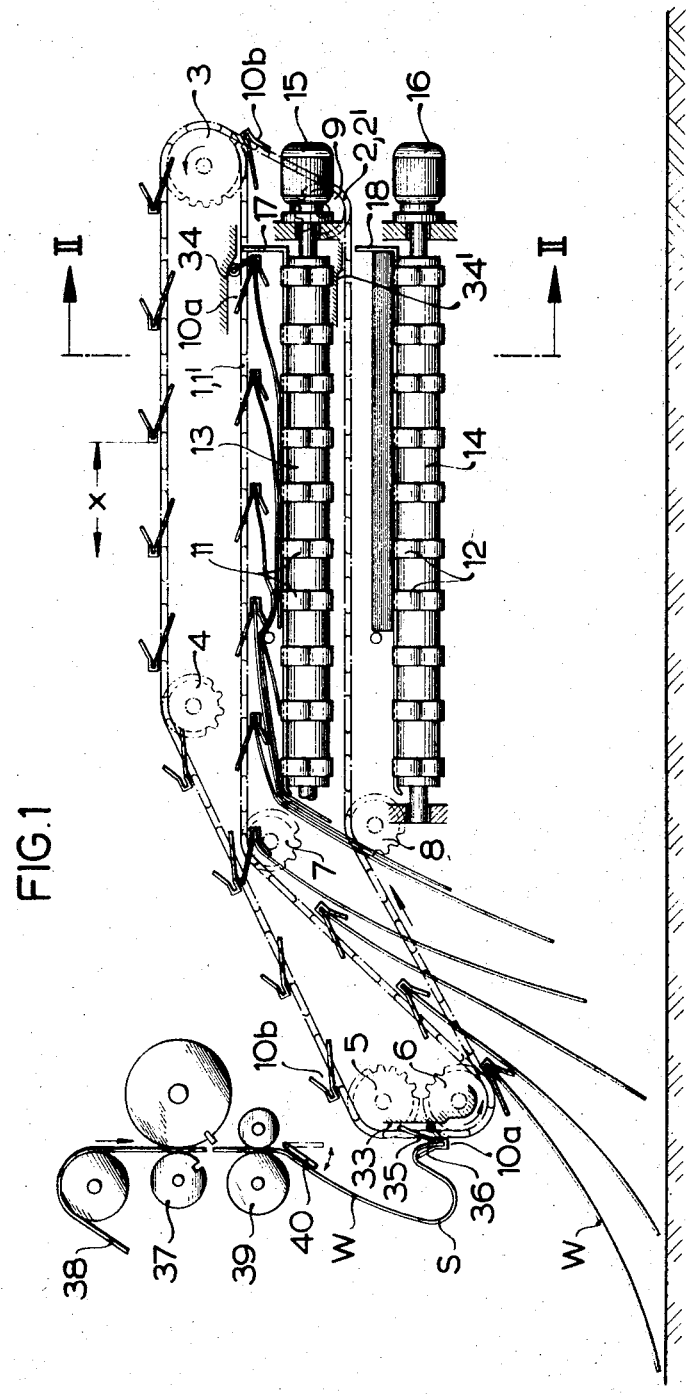
FIGS. 1 and 2 are, respectively, a side elevation and a sectional view taken on line A-A in FIG. 1 and show a stacking apparatus according to the invention, which apparatus comprises two chain conveyors.

The apparatus shown in the drawing comprises essentially two chain conveyors. Each of said conveyors comprises two endless conveyor chains, 1, 1' and 2, 2'. The upper courses of the conveyor chains are trained over sprockets 3, 4, 5, 6 and are parallel and extend in the same plane, as is apparent from FIG. 2. FIG. 1 shows that the lower courses lie in different planes because the chain conveyor 1, 1' is trained over the sprockets 7, and the conveyor 2, 2' is trained over the sprockets 8, 9.

The two chain conveyors have the same length and each conveyor is provided in one half of its length with gripping tools 10a, 1b, which will be described more in detail hereinafter. The gripping tools have the same spacing x on both chain conveyors. Those length sections of the two conveyors 1, 1' and 2, 2' which are set with gripping tools are staggered in the direction of travel in such a manner that these length sections follow each other while the gripping tool spacing is maintained. This arrangement is emphasized in FIG. 1 in that the first and last gripping tools of the series of grippers associated with the two chain conveyors are designated 10a and 10b, respectively. Instead of arranging the gripping tools on the chain conveyors in sections of equal length and to provide the same number of gripping tools in each length section thereof, these sections may differ in length and the series of gripping tools may comprise different numbers of such tools, provided that the total length of those length sections which are provided with gripping tools is exactly as large as the length of one chain conveyor.

A belt conveyor 11 or 12 consisting preferably of a plurality of individual conveyor belts is disposed under the lower course of each conveyor 1, 1' or 2, 2'. The belt conveyors 11, 12 travel transversely to the direction of travel of the chain conveyors 1, 1' and 2, 2'. The driving pulleys 13, 14 of the belt conveyors 11, 12 are driven by electric motors 15, 16. Stops 17, 18 extend above each transverse belt conveyor in a direction which is transverse to the direction of travel of the chain conveyors 1, 1' and 2, 2'. Adjacent to the gripping tools 10a, 10b, the stops are provided with indentations 19, 20, through which the grippers 22 of the gripping tools 10a, 10b can move freely. The stops 17, 18 may be stationary or may reciprocate parallel to themselves, as is indicated by a double arrow in FIG. 1, so that the workpieces are exactly aligned in the stack.

Figure 2:
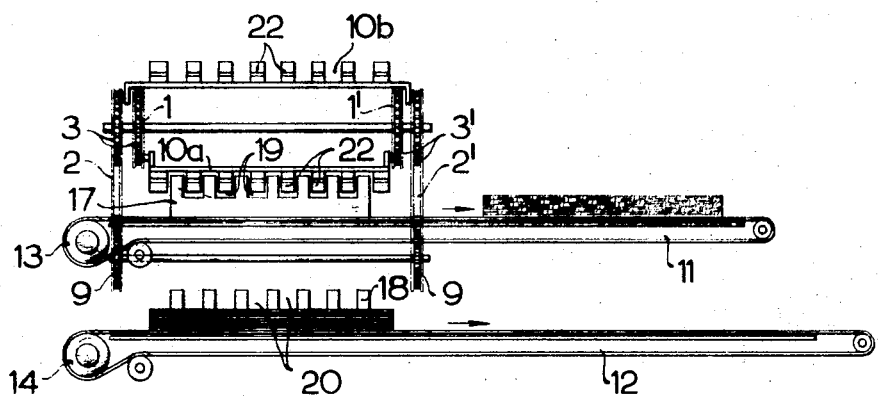

The transverse belt conveyors 11, 12 may be extend at right angles to the direction of travel of the chain conveyors 1, 1' and 2, 2' and may convey in the same direction, as is indicated in FIG. 2. To facilitate the removal of the stacks of workpieces from the transverse belt conveyors, the lower belt conveyor 12 is longer than the upper one. In accordance with FIGS. 5 and 6, this arrangement may be further developed by the provision of a transfer belt conveyor 11a, which succeeds the upper transverse belt conveyor so that the stacks of workpieces conveyed by the upper transverse belt conveyor are transferred to the lower transverse belt conveyor 12. Depending on the length of the transfer belt conveyor 11a, these stacks will be transferred exactly onto the stacks of workpieces on the lower belt conveyor, as is shown in FIGS. 5 and 6, or into the spaces between the stacks of workpieces on the lower transverse belt conveyor; in the latter case these spaces must be larger than is shown in FIGS. 5 and 6. To this end, the transfer belt conveyor 11a is provided with a separate drive motor and is alternately driven in synchronism with the upper and lower transverse belt conveyors, respectively, so that the transfer belt conveyor can receive the stacks of workpieces from the upper transverse belt conveyor during the operation of the latter and can transfer the stacks carried by it to the lower transverse belt conveyor when the latter is in operation.

In accordance with FIGS. 7 and 8, the transverse belt conveyors 11, 12 may extend obliquely with respect to the chain conveyors 1, 1' and 2, 2' and may diverge outwardly from the latter to the same side so that the stacks of workpieces being discharged are freely accessible from above, as is indicated in FIG. 8. As the transverse belt conveyor 12 has then a component of movement which is parallel to the chain conveyor 2, 2' and in the direction of conveyance of the latter, the stop 18 disposed above said transverse belt conveyor 12 must be pivotally moved to the position shown in dash-dot lines so that it will not obstruct the removal of the stacks of workpieces when the transverse belt conveyor 12 is in operation. The outer part of the upper transverse belt conveyor 11 is preferably downwardly inclined to the level of the other transverse belt conveyor 12 so that the delivery ends of both transverse belt conveyors 11, 12 lie on one and the same level, which permits of a convenient removal of the stacks. At the delivery end, each individual conveyor belt is trained around a respective reversing pulley 11' or 12', respectively. These pulleys are mounted on a line which is parallel to the leading edge of the stack. At the charging end, all conveyor belts of each transverse belt conveyor are trained around a single rollshaped drive pulley 11'' or 12'', respectively, which is mounted on an axis that is transverse to the belt conveyors.

As is shown in FIGS. 9 and 10, the transverse belt conveyors may extend and convey in opposite directions so that the stacks of workpieces are freely accessible on both sides of the chain conveyors 1, 1' and 2, 2'.

Figure 3:
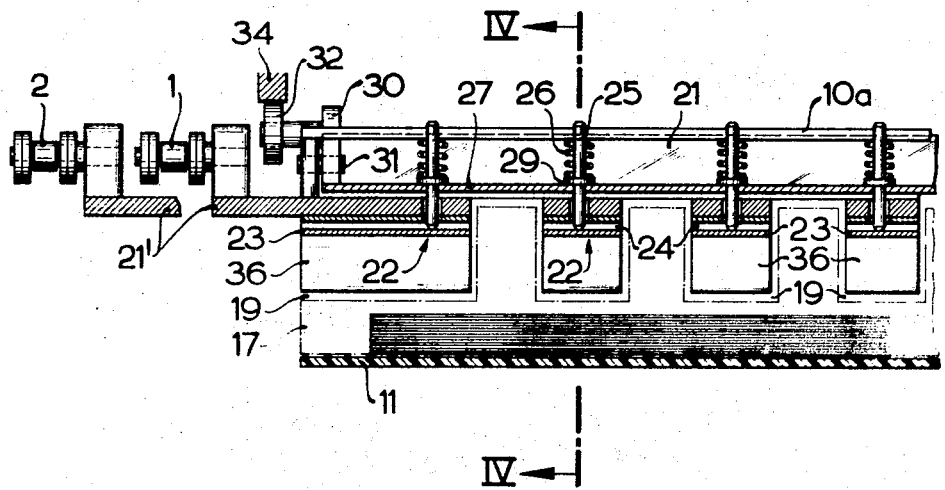
FIG. 3 is a longitudinal sectional view taken on line B-B in FIG. 3 and shows the gripping tool.
Figure 4:
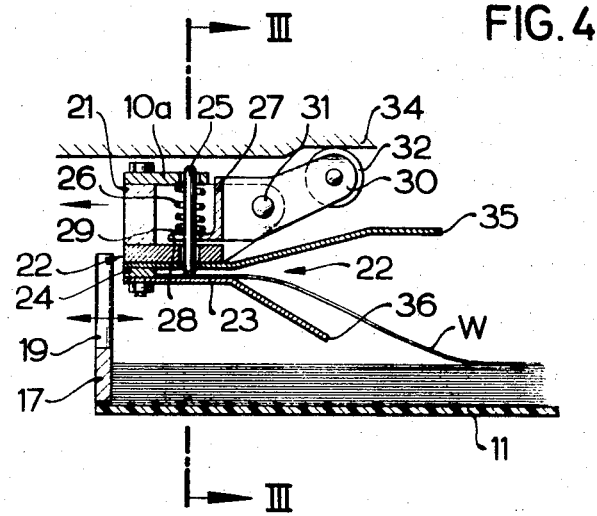
FIG. 4 shows the gripping tools in a transverse sectional view taken on line C-C in FIG. 3.

As is shown in FIGS. 3 and 4, the gripping tools 10a, 10b consist of an elongated carrier 21, which corresponds to the width of the workpieces and is secured with the aid of the lateral mating members 21' to the pair of conveyor chains 1, 1' or 2, 2' and extends between the chains of the pair transversely to the direction of travel thereof. A plurality of spaced apart grippers 22 are secured to the carrier 21. Each gripper comprises a fixed gripping jaw 23, a stop 24 for the workpiece W and a movable gripping jaw in the form of a pin 25, which is movable up and down and biased by a spring 26. The pins 25 of the gripping tool are moved up and down at the same time by a bar 27, which has forklike indentations 28, where the bar engages the underside of collars 29, which are carried by the pins and engaged from above by the springs 26. The ends of the bar 27 are secured to levers 30, which are pivoted to the carrier 21 by pins 31. Cam follower rollers 32 are rotatably mounted at the free ends of the levers and cooperate with stationary cams 33, 34 to raise and lower the pins 25 so as to open and close the grippers 22. The arrangement of the collars 29 and the bar 27 is such that the pins 25 clear the bar 27 during the closing movement so that the springs cause the pins to engage the fixed jaw 23 or the workpiece W lying on said fixed jaw. This action of each pin being independent of the other pins, it is ensured that all grippers will retain the workpiece. On the workpiece-receiving side, the mouth of each gripper is provided with converging faces 35, 36 for guiding the workpiece as it enters the gripper.

Different from the embodiment shown by way of example, the gripping tools have any desired known design. If the spacing x of the gripping tools exceeds the length of workpiece, the workpieces may be delivered to the chain conveyors 1, 1' and 2, 2' at any desired point of the chain conveyors where the conveyor chains move parallel to each other in a common plane and this delivery may be effected with known means, such as rotating gripper cylinders.

If the spacing x of the gripping tools is less than the length of the workpiece and the speed of travel of the gripping tools is less than the production speed of the processing machine, precautions must be taken to prevent a covering of the gripping tools by the preceding workpiece. For instance, in accordance with FIG. 1, the chain conveyors 1, 1' and 2, 2' extend around two sprocket sets 5, 6, which are arranged one over the other so that the conveyors move downwardly in an approximately vertical plane between these sprocket sets. The workpieces W to be stacked consist in the present embodiment of tube sections of paper or plastics material sheeting and are severed in a predetermined length from a continuous tubing 38 by a cutting tool 37 and are conveyed in a downward vertical direction by the feed rolls 39 at the speed of the production machine and in the same plane in which the gripping tools 10a, 10b move downwardly at a lower speed between the sprocket sets 5, 6. As a result, the workpieces W overtake the gripping tools and are guided by the guide plates 35, 36 into the gripping tools 10a, 10b, which are being opened by the action of the cam 33. Under the action of the same cam 33, the gripping tools 10a, 10b are subsequently closed and caused to retain the workpiece at its leading edge. Because the free end of the workpiece is advanced at a higher speed by the feed rolls 39, the workpiece forms a natural loop S under the action of gravity. As the workpiece moves around the feed rolls 39, this loop prevents the workpiece from covering the next following gripping tool. The formation of the loop is assisted by a pivoted deflector 40, which is disposed below the feed rolls 39 and which is pivotally moved into the inclined position, shown in solid lines, shortly after the gripping tools have been closed. In that position, the free end of the workpiece is deflected outwardly by the deflector 40.

The gripping tools 10a, 10b then drag the workpieces in the lower course of the respective chain conveyor 1, 1' or 2, 2' close to the associated stop 17 or 18 disposed over the belt conveyor 11 or 12 and are opened under the action of the cams 34, 34' shortly before the stop is reached. The leading edge of the workpiece engages the stop 17 or 18 and the workpiece falls by gravity onto the associated belt conveyor 11 or 12, whereas the grippers 22 extend freely through indentations 19, 20 of the stops 17 and 18 (FIGS. 4 and 5). The belt conveyors 11, 12 are inoperative when the workpieces are being dropped so that the workpieces form stacks on the belt conveyors, as is shown in the lower part of FIG. 1 and in FIG. 4.

As each of the chain conveyors 1, 1' and 2, 2' is provided with gripping tools 10a, 10b only in one half of its length, the described formation of the stack is performed only during the transit of this half-length through the respective lower course. The transit time of the other half, which is free of gripping tools, is available for an operation of the belt conveyors 11, 12 to carry away the stacks of workpieces.

In the embodiment shown by way of example, one half of the length of each chain conveyor is provided with 10 gripping tools so that a stack of 10 workpieces is formed on and carried away by each belt conveyor 11, 12 during one revolution of the chain conveyors. When it is desired to form stacks containing more workpieces, the belt conveyors 11, 12 will be operated after a plurality of revolutions of the chain conveyors. When the chain conveyors have the same lengths and are provided with different numbers of gripping tools in sections of different lengths, the stacks formed on the transverse belt conveyors will contain different numbers of workpieces. For instance, if the chain conveyor 1, 1' carries five gripping tools and the chain conveyor 2, 2' carries 15 gripping tools, five workpieces will be deposited on the transverse belt conveyor 12 during each revolution of the chain conveyors.

The starting and stopping of the belt conveyors may be automatically controlled by known counter-operated switches, which perform the switching operation when the associated gripping tools 10a, 10b have moved through the lower course once or several times. Stacks containing any desired numbers of workpieces can be formed if the number of gripping tools and/or the number of revolutions of the chain conveyors between two switching operations to control the belt conveyors are properly selected.

I claim:

1. A stacking apparatus for use with machines for processing paper and plastics material sheeting, preferably for making bags, which apparatus comprises endless conveyor chains which convey the workpieces in gripping tools, and means for collecting the workpieces, characterized in that at least two endless chain conveyors 1,1' and 2,2' extend through a common workpiece-charging area, the collecting means 11, 12, 17, 18, 34, 34' associated with the chain conveyors are spaced apart, each chain conveyor extends as far as to the associated collecting means, the chain conveyors are provided with regularly spaced gripping tools 10a, 10b only in sections of their length and those length sections of the chain conveyors which are provided with gripping tools are staggered so as to move in alternation without interruption through the workpiece-charging area.

2. Apparatus according to claim 1, characterized in that the chain conveyors 1, 1' and 2, 2' have the same length and their lower courses extend in different planes.

3. Apparatus according to claim 2, characterized in that the means for collecting the workpieces are associated with the lower courses of the chain conveyors 1, 1' and 2, 2' and consist of a transverse belt conveyor (11, 12) for each lower course, a transverse stop 17, 18 disposed above the transverse belt conveyor and engageable by the leading end of the workpiece, and means 34,34' for opening the gripping tools 10a, 10b shortly before they reach the transverse stop, and the transverse belt conveyors (11, 12) are intermittently operable in such a manner that they perform their conveying movement only during the transit of that length section of the associated chain conveyor which is free of gripping tools along the lower course of said conveyor.

4. Apparatus according to claim 3, characterized in that the transverse belt conveyors 11, 12 extend out of the apparatus on the same side and the lower transverse belt conveyor (12) is longer than the upper one (11) and the upper transverse belt conveyor is succeeded by a transfer belt conveyor 11a, which is alternately driven in synchronism with the upper and lower belt conveyors, respectively.

5. Apparatus according to claim 3, characterized in that the transverse belt conveyors 11, 12 extend in opposite directions out of the apparatus.

6. Apparatus according to claim 3, characterized in that the transverse belt conveyors 11, 12 extend out of the apparatus in diverging directions on the same side of the chain conveyors 1, 1' and 2, 2'.

7. Apparatus according to claim 6, characterized in that the transverse belt conveyors 11, 12 are on the same level at the delivery end.

8. Apparatus according to claim 1, characterized in that the spacing $x$ of the gripping tools 10a, 10b is less than the length of the conveyed workpieces and the speed of travel of the chain conveyors 1, 1' and 2, 2' is less than the speed of travel of the workpieces in the preceding processing machine.

9. Apparatus according to claim 8, characterized in that the chain conveyors 1, 1' and 2, 2' extend in an approximately vertical plane in the workpiece-charging area and the workpieces are fed in a vertical direction.

10. Apparatus according to claim 8, characterized by a pivoted deflector plate 4, which is disposed below the last set of workpiece-conveying rollers 39 and serves to deflect the free ends of the workpieces outwardly.

11. Apparatus according to claim 1, characterized in that the gripping tools 10a, 10b consist of an elongated carrier (21), which is provided with grippers (22) and secured with mating members 21' to the pair of conveyor chains 1, 1' or 2, 2'.

12. Apparatus according to claim 11, characterized in that the movable gripping jaw of each gripper (22) consists of a pin (25), which is urged by a spring 26 against the fixed gripping jaw 23.

13. Apparatus according to claim 11, characterized by a bar (27), which is pivoted to the carrier (21) by lateral levers (30) and has forklike indentations (28), where the bar engages the underside of collars (29) on the pins (25) of the gripping tool 10a, 10b, said bar being movable by means of cam follower rollers (32) carried by the levers (30) and cooperating with stationary cams 33, 34, 34'.

14. Apparatus according to claim 11, characterized in that the mouth of each gripper (22) is provided with converging guide plates 35, 36 on the workpiece-receiving side.